(12) United States Patent
Soler Garrido et al.

(10) Patent No.: US 12,093,011 B2
(45) Date of Patent: Sep. 17, 2024

(54) METHOD AND SYSTEM FOR GENERATING AN ARTIFICIAL INTELLIGENCE MODEL

(71) Applicant: SIEMENS AKTIENGESELLSCHAFT, Munich (DE)

(72) Inventors: Josep Soler Garrido, Munich (DE); Ingo Thon, Grasbrunn (DE); Johannes Frank, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 520 days.

(21) Appl. No.: 17/416,467

(22) PCT Filed: Dec. 20, 2019

(86) PCT No.: PCT/EP2019/086560
§ 371 (c)(1),
(2) Date: Jun. 18, 2021

(87) PCT Pub. No.: WO2020/127895
PCT Pub. Date: Jun. 25, 2020

(65) Prior Publication Data
US 2022/0066409 A1   Mar. 3, 2022

(30) Foreign Application Priority Data
Dec. 20, 2018   (EP) ..................... 18214536

(51) Int. Cl.
*G05B 19/05*   (2006.01)
*G06N 5/04*   (2023.01)
*G06N 20/00*   (2019.01)

(52) U.S. Cl.
CPC ............. *G05B 19/056* (2013.01); *G06N 5/04* (2013.01); *G06N 20/00* (2019.01)

(58) Field of Classification Search
CPC .......... G06N 20/00; G06N 5/022; G06N 3/08; G06N 5/04; G06N 7/01; G06N 3/045;
(Continued)

(56) References Cited

U.S. PATENT DOCUMENTS

| | | | |
|---|---|---|---|
| 11,586,960 B2 * | 2/2023 | Harris | G06N 5/022 |
| 11,762,635 B2 * | 9/2023 | Brown | G06N 3/008 |
| | | | 706/12 |

(Continued)

FOREIGN PATENT DOCUMENTS

| | | |
|---|---|---|
| CN | 108881446 A | 11/2018 |
| CN | 108700873 B | 2/2022 |

(Continued)

OTHER PUBLICATIONS

Zhang Jun et al: "Knowledge Programmable Intelligent Chip Systems (KPI-CS): Concept"; Architecture andVision; vol. 31; No. 10; DOI: 10.16451/j.cnki; ISSN: 1003-6059.201810001, pp. 1-8.

(Continued)

*Primary Examiner* — Darrin D Dunn
(74) *Attorney, Agent, or Firm* — Lempia Summerfield Katz LLC

(57) ABSTRACT

A method includes determining an artificial intelligence function in an engineering framework system. An inference path is defined for generation of an AI model by a computation graph. An AI function and the inference path are converted into a processing format. The converted AI function is sent and exported to an extraction and extension module of an AI workbench module. The extended computation graph of the inference path is transmitted from the extraction and extension module to an AI framework module. The method includes communicating of a communication adapter with the processing module continuously by using a supporting communication protocol for receiving (Continued)

training data as input for the AI function and forwarding the training data to the AI framework module. Learned parameters of the AI model are transferred from an API interface of the AI framework module to the communication adapter for updating the AI model.

18 Claims, 2 Drawing Sheets

(58) Field of Classification Search
CPC .............. G06N 3/04; G05B 13/027; G05B 2219/33296; G06F 16/9024
See application file for complete search history.

(56) References Cited

U.S. PATENT DOCUMENTS

| | | | |
|---|---|---|---|
| 11,775,850 B2* | 10/2023 | Campos | G06N 5/043 706/25 |
| 2018/0293517 A1 | 10/2018 | Browne et al. | |
| 2018/0357543 A1 | 12/2018 | Brown | |
| 2018/0357552 A1 | 12/2018 | Campos et al. | |
| 2019/0079506 A1 | 3/2019 | Hubauer | |
| 2020/0193286 A1 | 6/2020 | Byrnes | |
| 2022/0198296 A1* | 6/2022 | Liu | G06N 5/04 |
| 2022/0405546 A1* | 12/2022 | Yoon | G06N 3/105 |
| 2023/0162071 A1* | 5/2023 | Harris | G06N 5/022 706/13 |
| 2023/0252353 A1* | 8/2023 | R | G06N 3/063 706/12 |

FOREIGN PATENT DOCUMENTS

| | | |
|---|---|---|
| KR | 20070043126 A | 4/2007 |
| WO | 2016209221 A1 | 12/2016 |
| WO | 2018208813 A1 | 11/2018 |

OTHER PUBLICATIONS

European Search Report for European Application No. 18214536.7-1221 dated Jun. 17, 2019.

PCT International Search Report and Written Opinion of International Searching Authority mailed Feb. 3, 2020, corresponding to PCT International Application No. PCT/EP2019/086560.

Lopez, et al., "Nonlinear system modeling using convolutional neural networks"; 2017 14th International Conference on Electrical Engineering; Computing Science and Automatic Control; published: Dec. 9, 2018, pp. 1-5.

* cited by examiner

METHOD AND SYSTEM FOR GENERATING AN ARTIFICIAL INTELLIGENCE MODEL

This application is the National Stage of International Application No. PCT/EP2019/086560, filed Dec. 20, 2019, which claims the benefit of European Patent Application No. EP 18214536.7, filed Dec. 20, 2018. The entire contents of these documents are hereby incorporated herein by reference.

BACKGROUND

The present embodiments relate a method and system for generating an artificial intelligence model for an engineering system.

Conventionally, in a distributed system (e.g., a manufacturing plant), performing engineering and configuring different processes involves contribution from experts possessing domain knowledge of various types of equipment that are a part of such engineering. Performance of such engineering is largely dependent on experts referring manually to the engineering data associated with the equipment, selecting automation function instances (e.g., logical representations) for the equipment, and manually configuring the engineering of the distributed system. However, failure to automatically configure and perform the engineering typically results in engineering errors due to lack of verification and validation performed, of the engineering, while a process or a product is being engineered and while the engineering is being implemented in real time. Failure to automatically perform the engineering configuration also leads to an increase in the time, the cost, and the effort required for performing such engineering, thereby affecting an overall operational efficiency of the distributed control system.

Further, in scenarios of a downtime, maintenance, or equipment replacement, where new equipment is inserted into the distributed system, the conventional engineering methods and systems fail to automatically update configuration of the engineering (e.g., a software configuration or a network configuration, etc.) for incorporating the newly inserted equipment, as these conventional engineering methods and systems mainly rely on manual configuration of the process. This typically leads to increased maintenance costs.

For using artificial intelligence (AI) methods or machine learning (ML), for such a task, it is a typical approach that data of devices and/or systems and/or other data sources are recorded and then feed into an AI model. With this data, an AI model is trained for finding solutions for specific tasks. The training of the model is executed within the environment of an AI framework, such as Tensorflow™ or Theano™ or Caffe™ or Torch™, which is implemented on powerful hardware tools, as for the training of an AI model, high quantity of computational power and memory is needed.

However, for the execution of the final trained AI model, only a fraction of the computational power and memory is needed in comparison to the training. Therefore, the final AI model may be executed on a processing module of an edge device with limited computation resources that, in an industrial context, may be a Programmable Logic Controller (PLC). A programmable logic controller (PLC) or programmable controller is an industrial digital computer that has been adapted for the control of manufacturing processes, such as assembly lines, or robotic devices, or any activity that requires high reliability control and ease of programming and process fault diagnosis. Programmable logic controllers (PLCs) and programmable controllers are widely used as high-reliability automation controllers suitable for industrial environments.

For safety and security reasons, PLCs are normally closed platforms with limited access to an operating system. Therefore, a customer is to use an engineering framework such as the TIA Portal of SIEMENS for the configuration and programming of the PLCs. Therefore, various manual and labor intensive steps are executed in order to deploy an AI model on a PLC.

Further, in many cases, multiple iterations of these labor intensive deployment steps are to be executed since the recorded data for the training of an AI model does not always cover all possible system states. For an update of an AI model architecture (e.g., new sensor signals are added) or model parameters (e.g., system behavior changed), the training and deployment steps are to be repeated a number of times. Further, there is not always a data record or simulation for an industrial system available. Especially for highly dynamic systems such as network traffic, an online/live learning approach is to be provided.

Further, the configuration and programming of PLCs is usually done by customers who have limited knowledge about AI frameworks and respective high-level programming languages such as Python™. Normally, customers are used to deal with a typical engineering framework during the configuration and programming of PLCs. The default programming languages used in engineering frameworks use either graphical structures such as a Ladder Diagram or a Function Block Diagram or textual contents such as an Instruction List or a Structured Text (e.g., Structured Control Language).

Currently, a number of manual and labor intensive steps are to be executed in order to deploy an AI model into a PLC program. The adaption of an AI model is a continuous process, since in complex automation systems, changes of the environment or configuration may lead to deteriorated AI model results. In such a case, a further time-consuming iteration of data acquisition, training, and deployment is to be provided.

The document US 2018/293517 A1 describes an AI engine having an architect module to create a number of nodes and how the nodes are connected in a graph of concept nodes that make up a resulting AI model. The architect module also creates a first concept node by wrapping an external entity of code into a software container with an interface configured to exchange information in a protocol of a software language used by the external entity of code. The architect module also creates a second concept node derived from its description in a scripted file coded in a pedagogical programming language, and connects the second concept node into the graph of nodes in the resulting AI model.

SUMMARY AND DESCRIPTION

The scope of the present invention is defined solely by the appended claims and is not affected to any degree by the statements within this summary The present embodiments may obviate one or more of the drawbacks or limitations in the related art. For example, a method and a system for increasing efficiency of integrating an AI model into a processing module of an engineering system and simplifying adaptations of an AI model to rearrangements of the engineering system for performing engineering with an enhanced accuracy, in a time and a cost-effective manner, are provided.

According to a first aspect, the present embodiments provide a method for generating an artificial intelligence (AI) model for an engineering system. The method includes determining an AI function in an engineering framework system, where the AI function is a specific function block that includes the definition of operations of algorithms, defining an inference path, or the generation of the AI model starting from the determined AI function by a computation graph. The inference path for reaching the AI model is described by operation steps such as convolution or by providing function blocks that correspond to parameterizable layers or by a single function block that represents a complete neural network such as a convolutional neural network. The method includes converting the AI function and the inference path into a processing format, and sending and exporting the converted AI function and the converted interference path to an extraction and extension module of an AI workbench module. The extraction and extension module of the AI workbench module has the functionality to extract and extend the computation graph architecture of the previously defined inference path by operations of algorithms for model training. The method also includes deploying the converted AI function on a processing module of the engineering system and/or another processing device, and transmitting the extended computation graph of the inference path from the extraction and extension module to an AI framework module. The method includes communicating of a communication adapter with the processing module continuously by using a supporting communication protocol for receiving training data as input for the AI function and forwarding the training data to the AI framework module. The method includes transferring learned parameters of the AI model from an API interface of the AI framework module to the communication adapter for updating the AI model.

In an embodiment, the method includes evaluating an interface and a context annotation of the AI function by the extraction and extension module of the AI workbench module for extracting an address for storing the data and parameters on the processing module.

In a further embodiment, this address is used to automatically configure the communication adapter, which is used to communicate with the processing module.

In one embodiment, the communication protocol contains a semantic data model for the address of the AI function.

In a further embodiment, the processing module may be configured as a Programmable Logic Controller (PLC).

Further, the AI function includes a description of which parameters and data are needed for the training of the AI function.

According to a second aspect of the present embodiments, a system for generating an AI model including an engineering framework system that is configured to determine an AI function is provided. The AI function is a specific function block including the definition of operations of algorithms. The engineering framework system is configured to define an inference path for the generation of the AI model starting from the determined AI function by a computation graph. The inference path for reaching the AI model is described by operation steps such as convolution or by providing function blocks that correspond to parameterizable layers or by a single function block representing a complete neural network such as a convolutional neural network. The engineering framework system is configured to convert the AI function and the inference path into a processing format and to send and export the converted AI function to an extraction and extension module of an AI workbench module. The extraction and extension module of the AI workbench module has the functionality to extract and extend the computation graph architecture of the previously defined inference path by operations of algorithms for model training. A processing module of the engineering system and/or another processing device is used to deploy the converted AI function. Further, the extraction and extension module is configured to transmit the extended computation graph of the inference path to an AI framework module. A communication adapter is configured to communicate with the processing module continuously by using a supporting communication protocol for receiving training data as input for the AI function and forwarding the training data to the AI framework module. The AI framework module is configured to transfer learned parameters of the AI model from an API interface of the AI framework module to a communication adapter for updating the AI model (200).

In one embodiment, the extraction and extension module of the AI workbench module is configured to evaluate an interface and a context annotation of the AI function for extracting an address for storing the data and parameters on the processing module.

In an embodiment, this address is used to automatically configure the communication adapter that is used to communicate with the processing module.

In a further embodiment, the communication protocol contains a semantic data model for the address of the AI function.

Further, the processing module may be configured as a Programmable Logic Controller (PLC).

In one embodiment, the AI function includes a description of which parameters and data are needed for the training of the AI function.

The above-mentioned and other features of the present embodiments will now be addressed with reference to the accompanying drawings of the present embodiments. The illustrated embodiments are intended to illustrate, but not limit the invention.

DETAILED DESCRIPTION

Figure 1:
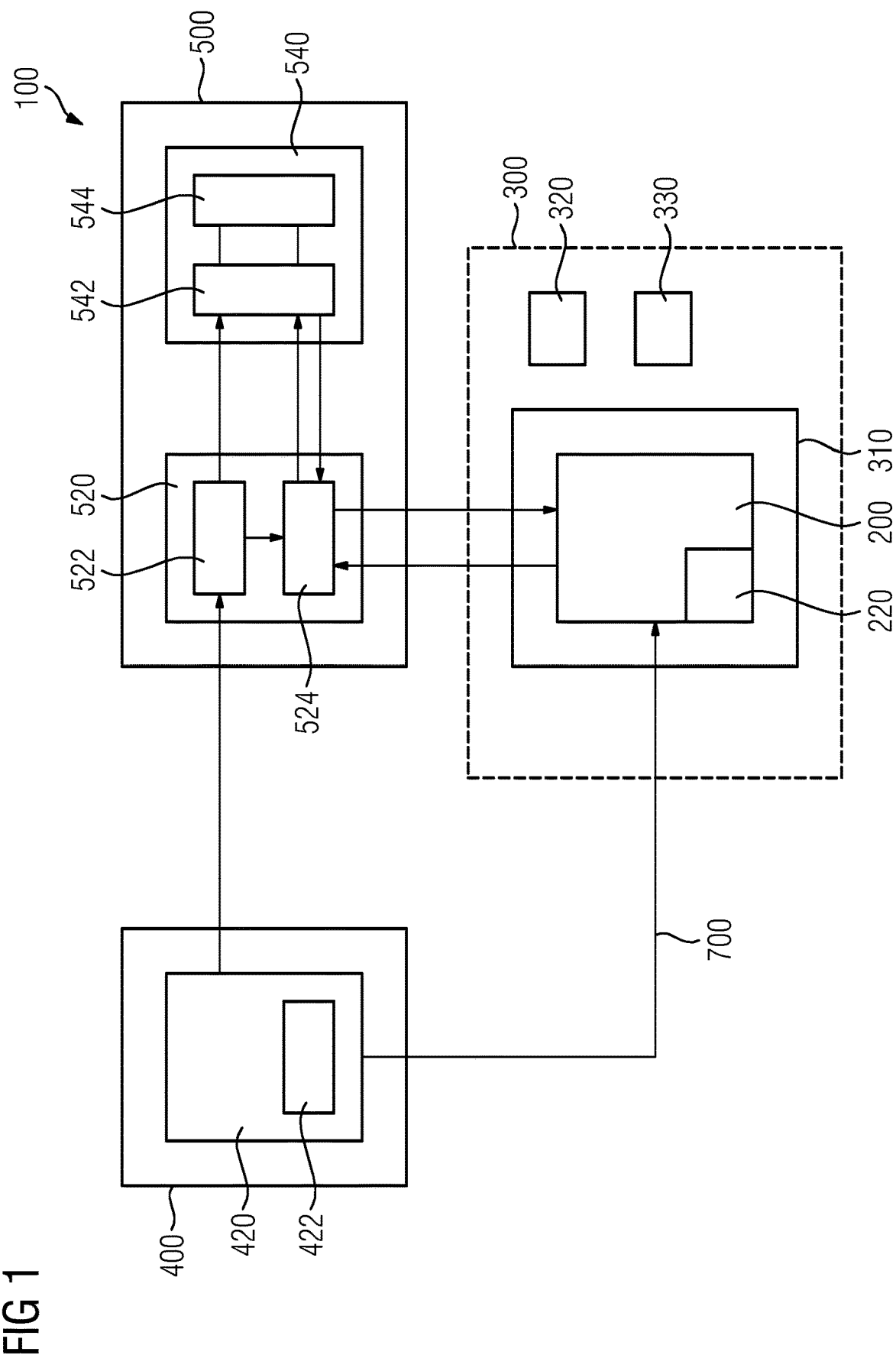
FIG. 1 schematically shows an exemplary system for generating an artificial intelligence (AI) model for the integration into a processing module of an engineering system according to an embodiment of a first aspect of the present embodiments.

Various embodiments are described with reference to the drawings, where like reference numerals are used to refer to like elements throughout. In the following description, for the purpose of explanation, numerous specific details are set forth in order to provide thorough understanding of one or more embodiments of the present invention. Such embodiments may be practiced without these specific details.

FIG. 1 illustrates a system 100 for generating an artificial intelligence (AI) model 200 for integration into a processing module 310 of an engineering system 300. In one embodiment, the processing module 310 includes a PLC program. The engineering system 300 may include a number of further processing modules 320, 330 that are connected by a communication network (not shown). The processing modules 310, 320, 330 are accessible by a user device (not shown) (e.g., a personal computing device, a workstation, a client device, a network enabled computing device, any other suitable computing equipment, and combinations of multiple pieces of computing equipment). A user using the user device may access an engineering framework system 400 (e.g., that may be also part of the engineering system 300). The engineering framework system 400 is connected with a backend system 500. The backend system 500 includes an AI workbench module 520 and an AI framework module 540. The AI workbench module 520 includes an extraction and extension module 522 and a communication adapter 524. The AI framework module 540 includes an application programming interface (API) module 542 and a training module 544. The engineering framework system 400, the backend system 500, and the processing modules 300, 310, 320 are connected via a communication network 700. The communication network 700 may include a cloud-based network. The communication network 700 may also represent a network shared for Internet of Things (IoT). Further, the engineering framework system 400, the backend system 500, and the processing modules 300, 310, 320 are provided with a database.

The engineering framework system 400, such as the TIA Portal of SIEMENS, includes standard functions (not shown) and at least one artificial intelligence (AI) function 420. An AI function 420 is a specific function block that includes the definition of operations of algorithms. AI functions 420 differ from standard engineering functions as the AI functions 420 may include parameters that may be optimized by a learning or training process, whereas in a standard engineering function, the result of physical measurements for certain parameters such as temperature, pressure etc. is recorded as data for these parameters, or a customer/user may also provide default values or estimations for such parameters.

Figure 2:
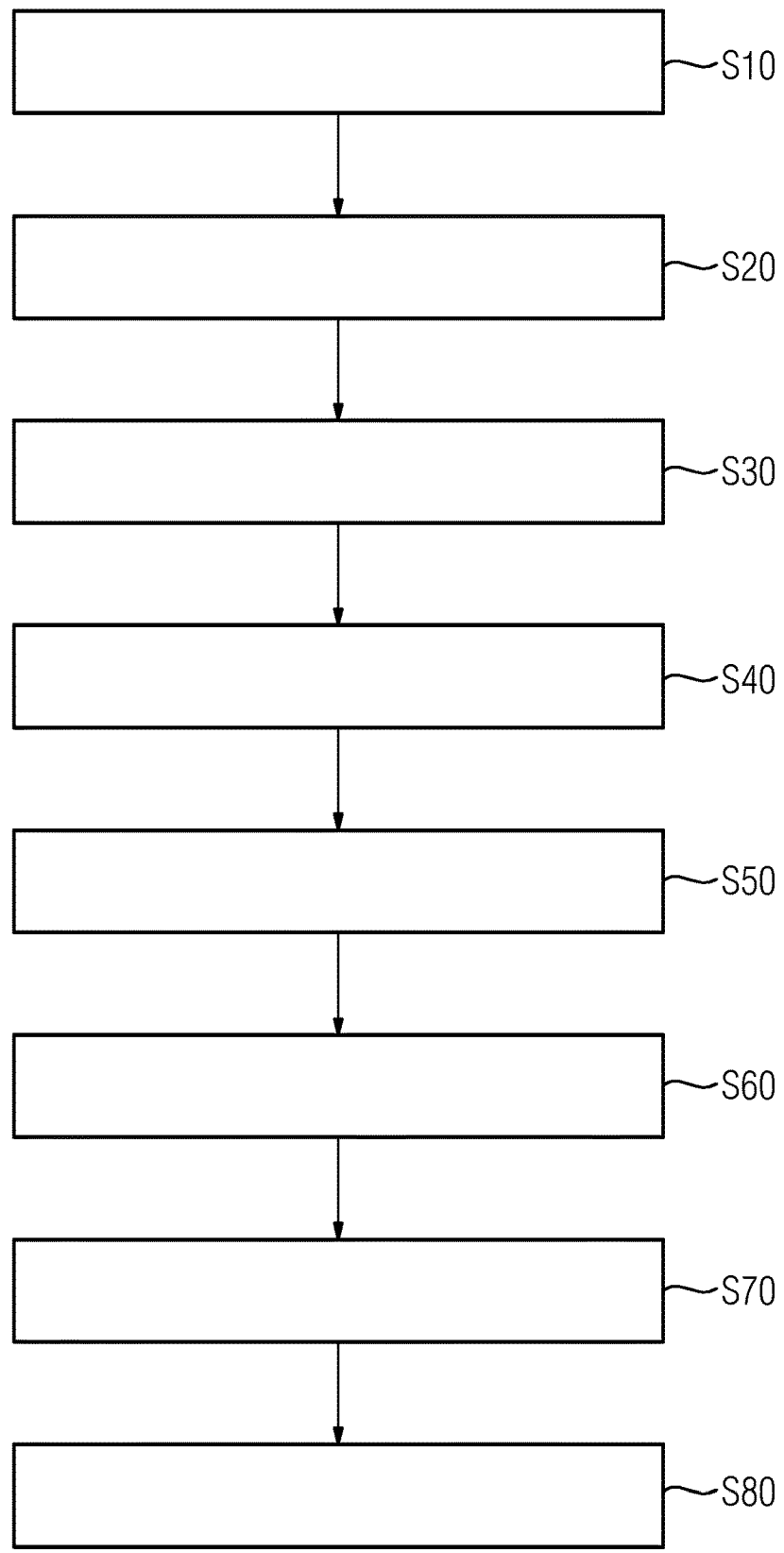
FIG. 2 shows a schematic flow diagram illustrating an embodiment of a method according to a second aspect of the present embodiments.

In FIG. 2, a number of main acts according to a possible embodiment of the computer implemented method are illustrated.

In act S10, the AI function 420 is determined in the engineering framework system 400. The AI function 420 includes a description of which parameters and data are to be provided for the training of the AI function 420. The description of the AI function 420 may include pre/post-determination of specific parameters and/or further annotations.

In act S20, an inference path 422 for generating the AI model 200 starting from the determined AI function 420 is defined by a computation graph. Computation graphs are used by most AI Frameworks such as Tensorflow™, Theano™, Caffe™ and Torch™ in order to describe AI models 200. In general, the inference path 422 for reaching the AI model 200 may be described by operation steps such as convolution. Further, the inference path 422 may be described by providing function blocks that correspond to parameterizable layers (e.g., convolutional layer with a particular pooling and activation function) or by a single function block that represents a complete neural network such as a convolutional neural network CNN. Further abstraction may be obtained by providing a library of single, parameterizable function blocks that serve for specific purposes such as anomaly detection, object recognition. Such a description of the inference path 422 may be of interest in applications dealing with image recognition and analysis such as microscopy, radiology, video surveillance, etc.

In the next act S30, the AI function 420, including the inference path 422 with the computation graph architecture and the description of the input/output and the relevant parameters, is converted into a processing format, such as SCL, XML or other serialized formats.

In act S40, the converted AI function 420 is sent and exported to the extraction and extension module 522 of the AI workbench module 520. This may be executed automatically by the engineering framework system 400 (e.g., by using the TIA Portal Openness API).

In act 550, the converted AI function 420 is deployed on the processing module 310. In a further embodiment, it is also possible, instead of deploying the converted AI function 420 directly on the processing module 310, to move the execution to a further specialized AI hardware module that is configured as a processing module extension.

The AI workbench module 520 has the functionality to extract the computation graph architecture of the previously defined inference path 422. The extracted computation graph is extended in the extraction and extension module 522 by operations of algorithms for model training such as mathematical loss functions, differentiation and integration operations, optimizer. The extension of the computation graph is executed automatically based on the type of problem defined by the inference path 422. Examples of extensions are a mean squared error for a regression problem, a cross entropy for a classification problem, and/or an optimizer that may be developed by a heuristic or by using machine learning.

In act S60, the extended computation graph of the inference path 422 is transmitted from the extraction and extension module 522 to the AI framework module 540 using the application programming interface (API) 542, which may be configured as a Representational State Transfer (REST) API. The AI workbench module 520 and the AI framework module 540 are separate modules in order to enable different deployment options.

In act S70, the communication adapter 524 communicates continuously with the processing module 310 by using a supported industrial protocol such as the OPC Unified Architecture (OPC UA), which is a machine to machine communication protocol for industrial automation developed by the OPC Foundation. The communication adapter 524 receives field data that is transmitted as an input to the AI model 200, and forwards the field data to the AI framework 540 for training of the AI model 200.

In act S80, the API interface 542 of the AI framework module 540 transfers learned parameters of the AI model 200 to the communication adapter 524. The learned parameters of the AI model 200 are sent to the communication adapter 524, which transmits the learned parameters back to the processing module 310 in order to update the AI model 200.

An interface and a context annotation of the AI function 420 may be evaluated by the extraction and extension module 522 during the extraction of the inference path 422 for extracting an address 220 where the data is stored on the processing module 310.

This address 220 is used to automatically configure the communication adapter 524, which is used to communicate with a communication protocol running on the processing module 310. In a further embodiment, the communication protocol contains a semantic data model for the address 220 of the AI function 420. The semantic data model generates a mapping structure from an abstract information model to the specific addresses 220 of the processing module 310. This allows using several similar automation systems without the need to specify their specific addresses 220 in the communication adapter 524. Instead, the communication adapter 524 uses the semantic data model for the generation of the address 220.

A modification of the AI model 200 is executed in the engineering framework 400 by adapting the AI function 420. This may be a modification of a block interface such as adding further sensor inputs or the model architecture for the AI model 200. The engineering framework system 400 detects these changes, and the AI function 420 may be adapted (e.g., by a user). Then, the acts S10 to S80 are executed again according to the method of the present embodiments.

In order to train the AI model 200 efficiently, the AI framework 540 needs, for its execution, a powerful backend system 500 such as an industrial computer environment. On the other hand, the main task of the AI workbench 520 is the extraction/extension and communication of the AI function 420 and does not need so much computational power. Therefore, in a further embodiment, the AI workbench 520 may be moved to another less-powerful hardware module.

In the following, one example for an AI model 200 is described.

The AI model 200 may deal with a simple regression problem:

$$y(x)=w*x+b$$

The function y(x) describes the output based on an input x and the parameters w and b.

The corresponding AI function 420 includes function blocks that may be represented by using a Ladder Diagram and an SCL representation.

Each AI function block corresponds to an operation in the AI framework. A processed export (e.g., a serialized export) of the AI function 420 may be created as described by the following protocol:

```
FUNCTION_BLOCK "AI_Function"
{ S7_Optimized_Access := 'TRUE' }
VERSION : 0.1
    VAR_INPUT
        x: Array[0..0, 0..0] of Real;
        y: Array[0..0, 0..1] of Real;
    END_VAR
    VAR_OUTPUT
        y_estimate : Array[0..0, 0..1] of Real;
    END_VAR
    VAR_TEMP
        w : Array[0..0, 0..1] of Real;
        b : Array[0..0, 0..1] of Real;
    END_VAR
    VAR_TEMP
    multiply_result : Array[0..0, 0..1] of Real;
    END_VAR
    BEGIN
    // y = w * x + b
    "multiply"(a:=#x,
        b:=#w,
        c=>#multiply_result);
        "add"(a:=#multiply_result,
        b:=#b,
        c=>#y_estimate);
    END_FUNCTION_BLOCK
```

By extraction and extension of the inference path 422, a computation graph such as Tensorflow™ may be generated and may correspond to the following Python™ code:
import tensorflow as tf
Model input
x=tf.placeholder(dtype=tf.float32, shape=[None, 1], name='x')
y=tf.placeholder(dtype=tf.float32, shape=[None, 2], name='y')
Model parameters
w=tf.Variable(dtype=tf.float32, name='weights')
b=tf.Variable(dtype=tf.float32, name='bias')
Inference path
multiply_result=tf.multiply(x, w, name='multiply_result') y_estimate=tf.add(mul, b, name='y_estimate')
Training operations
loss=tf.reduce_sum(tf.pow(y_estimate-y, 2), name='loss')
learning_rate=tf.placeholder(tf.float32, shape=[ ], name='learning_rate')
momentum=tf.placeholder(tf.float32, shape=[ ], name=momentum')
optimizer=tf.train.MomentumOptimizer (learning_rate=learning_rate,momentum=momentum. minimize(loss, name='minimize')

In order to communicate continuously with the processing module 310 for providing training data and pushing model updates, the interface and calling context of the AI function 420 is evaluated. With this information, the following addresses 220 may be used in the processing module 310:
"AI_Function_DB"."x"
"AI_Function_DB"."y"
"AI_Function_DB"."y_estimate"
"AI_Function_DB"."w"
"AI Function DB"."b"

Based on this information, the communication adapter 524 may be configured automatically by specifying the corresponding OPC UA topics. Now, the communication adapter 524 is able to communicate continuously with the communication protocol on the processing module 310 in order to provide the inputs (x and y) for the AI function 420, transmit the inputs to the AI framework module 540 for model training, and write back the learned model parameters (wand b) for an AI model 200 update.

The present embodiments improve significantly the workflow for training and deployment of AI models 200 for an engineering system 300. This leads to faster development, extension, and updates of new model architectures. Further, it enables electrical engineers/PLC programmers to use their known environment for the definition of AI models 200 so that it is not necessary for the electrical engineers/PLC programmers to learn the whole functionality of AI frameworks 540 and the respective programming languages.

Additionally, the present embodiments enable efficient online/live training and model parameter updates by the automated configuration of the communication adapter 524 between the processing module 310 and the AI framework module 540.

The AI functions 420 are available in the engineering framework system 400 and contain the definition of an architecture for the AI model 200.

The AI workbench module 520 automatically extracts the definition of the AI model 200 from the AI function 420 generated by the engineering framework system 400.

The communication adapter 524 is part of the AI workbench 520 and is configured automatically based on interfaces of the AI function 420.

According to the present method and system of the present embodiments, the AI framework module 540 communicates continuously with the processing module 310. For the communication and further monitoring of the generating system 100, the communication adapter 524, which uses an industrial protocol such as a server that is supported by the processing module 310 and a gateway that transmits data to the AI framework system 540, is to be provided.

The method and system of the present embodiments provide a solution for integrating machine learning (ML) into an engineering framework system 400, such as the Totally Integrated Automation (TIA) Portal of SIEMENS, for improving the use of artificial intelligence (AI) methods. This allows the user to efficiently use methods of artificial intelligence to generate solutions for his/her automation projects in the industry or in other sectors.

By the method and system of the present embodiments, the workflow for the definition and training of an AI model 200 and corresponding deployment on processing modules 310 may be automated by using open interfaces of the different modules 520, 522, 524, 540, 542, 544 of the generating system 100. Further, this enables customers and users to use AI functions 420 in known engineering framework systems 400 without any further knowledge with respect to an AI framework system 540 for the generation of an AI function 420. By the method and system of the present embodiments, the integration of an AI function 420 into a known engineering framework system 400 is possible in a transparent manner.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer implemented method for generating an artificial intelligence (AI) model for an engineering system, the computer implemented method comprising:
   determining an AI function in an engineering framework, wherein the AI function is a specific function block comprising a definition of operations of algorithms;
   defining an inference path for the generation of the AI model starting from the determined AI function by a computation graph, wherein the inference path for reaching the AI model is described by operation steps or by providing function blocks that correspond to parameterizable layers or by a single function block representing a complete neural network;
   converting the AI function and the inference path into a processing format;
   sending and exporting the converted AI function and the converted inference path to an extraction and extension module of an AI workbench module, wherein the extraction and extension module of the AI workbench module has a functionality to extract and extend the computation graph architecture of the previously defined inference path by operations of algorithms for model training;
   deploying the converted AI function on one or more processors;
   transmitting the extended computation graph of the inference path from the extraction and extension module to another processor;
   communicating of a communication adapter with a processor of the one or more processors continuously by using a supporting communication protocol for receiving training data as input for the AI function and forwarding the training data to the other processor; and
   transferring learned parameters of the AI model from an API interface of the other processor to the communication adapter for updating the AI model.

2. The method of claim 1, further comprising:
   evaluating an interface and a context annotation of the AI function by the extraction and extension module of the AI workbench module for extracting an address for storing data and parameters on the processor.

3. The method of claim 2, wherein the address is used to automatically configure the communication adapter, which is used to communicate with the processor.

4. The method of claim 1, wherein the supporting communication protocol contains a semantic data model for an address of the AI function.

5. The method of claim 1, wherein the processor is configurable as a Programmable Logic Controller (PLC).

6. The method of claim 1, wherein the AI function comprises a description of which parameters and data are needed for training of the AI function.

7. The method of claim 3, wherein the supporting communication protocol contains a semantic data model for an address of the AI function.

8. The method of claim 7, wherein the processor is configurable as a Programmable Logic Controller (PLC).

9. The method of claim 8, wherein the AI function comprises a description of which parameters and data are needed for training of the AI function.

10. A system for generating an artificial intelligence (AI) model, the system comprising:
    one or more processors configured to execute an engineering framework, the one or more processors being configured to:
       determine an AI function, the AI function being a specific function block comprising a definition of operations of algorithms;
       define a inference path for generation of the AI model starting from the determined AI function by a computation graph, wherein the inference path for reaching the AI model is described by operation steps or by providing function blocks that correspond to parameterizable layers or by a single function block representing a complete neural network;
       convert the AI function and the inference path into a processing format, and export the converted AI function and the converted inference path to an extraction and extension module of an AI workbench module, wherein the extraction and extension module of the AI workbench module has the functionality to extract and extend the computation graph architecture of the previously defined inference path by operations of algorithms for model training and is configured to transmit the extended computation graph of the inference path to another processor; and
       deploy the converted AI function; and
    a communication adapter configured to communicate with a processor of the one or more processors continuously using a supporting communication protocol for receiving training data as input for the AI function and forwarding the training data to the other processor, wherein the other processor is configured to transfer learned parameters of the AI model using an API interface to the communication adapter for updating the AI model.

11. The system of claim 10, wherein the extraction and extension module of the AI workbench module is configured to evaluate an interface and a context annotation of the AI function for extracting an address for storing the data and parameters on the one or more processors.

12. The system of claim 11, wherein the extracted address is used to configure automatically the communication adapter that is used to communicate with the one or more processors.

13. The system of claim 11, wherein the communication protocol contains a semantic data model for the address of the AI function.

14. The system of claim 11,
wherein the processor is configured as a programmable logic controller (PLC).

15. The system of claim 11, wherein the AI function comprises a description of which parameters and data are needed for the training of the AI function.

16. The system of claim 12, wherein the communication protocol contains a semantic data model for the address of the AI function.

17. The system of claim 16,
wherein the processor is configured as a programmable logic controller (PLC).

18. The system of claim 17, wherein the AI function comprises a description of which parameters and data are needed for the training of the AI function.

* * * * *